(12) United States Patent
Nishikawa

(10) Patent No.: US 7,035,173 B2
(45) Date of Patent: Apr. 25, 2006

(54) OPTICAL PICKUP APPARATUS

(75) Inventor: Masayuki Nishikawa, Higashiosaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 577 days.

(21) Appl. No.: 10/004,641

(22) Filed: Dec. 5, 2001

(65) Prior Publication Data

US 2002/0101799 A1    Aug. 1, 2002

(30) Foreign Application Priority Data

Dec. 5, 2000    (JP)    ............................ P2000-369664

(51) Int. Cl.
    *G11B 7/00*    (2006.01)
(52) U.S. Cl. .............................. 369/44.23; 369/112.23; 369/112.24
(58) Field of Classification Search ........... 369/112.24, 369/112.29, 112.23, 44.14, 44.15
    See application file for complete search history.

(56) References Cited

U.S. PATENT DOCUMENTS

| | | | |
|---|---|---|---|
| 5,097,456 A * | 3/1992 | Tanoshima et al. | 369/44.15 |
| 5,995,292 A * | 11/1999 | McDonald | 359/708 |
| 6,108,139 A * | 8/2000 | Takahashi | 359/719 |
| 6,115,192 A * | 9/2000 | McDonald | 359/708 |
| 6,278,551 B1 * | 8/2001 | Matsuo | 369/44.14 |
| 6,324,133 B1 * | 11/2001 | Ichimura | 369/112.24 |
| 6,414,931 B1 * | 7/2002 | Maeda et al. | 369/112.24 |
| 6,438,090 B1 * | 8/2002 | Nakano | 369/112.24 |

FOREIGN PATENT DOCUMENTS

| | | |
|---|---|---|
| JP | 4219627 | 8/1992 |
| JP | 5-266511 | 10/1993 |
| JP | 8-212579 | 8/1996 |
| JP | 10-40566 | 2/1998 |
| JP | 11-110794 | 4/1999 |
| JP | 2000-030290 | 1/2000 |

* cited by examiner

*Primary Examiner*—Hoa T. Nguyen
*Assistant Examiner*—Jorge L. Ortiz-Criado
(74) *Attorney, Agent, or Firm*—David C. Conlin; David A. Tucker; Edwards Angell Palmer & Dodge LLP

(57) ABSTRACT

An object of the invention is to provide an optical pickup apparatus which, using a single optical system having a large NA objective lens, can compensate for the spherical aberration caused due to manufacturing errors in the thickness of recording media, as well as the spherical aberration caused due to the recording surface position in the thickness direction which differs depending on the type of recording medium, and can thus perform recording or playback on different types of recording media. A lens assembly having a plurality of lenses each of which is independently displaceable along its optical axis is interposed between a light source and an objective lens, and the lenses in the lens assembly are moved by a lens driving means independently of each other along their respective optical axes in such a manner as to reduce a spherical aberration caused due to the thickness of the light transmitting layer of the recording medium and spherical aberrations on optical surfaces of the optical system.

6 Claims, 9 Drawing Sheets

OPTICAL PICKUP APPARATUS

BACKGROUND OF THE INVENTION

1. Field of the Invention

The present invention relates to an optical pickup apparatus to be used to record or play back information signals on an optical recording medium such as an optical disk.

2. Description of the Related Art

Optical recording media are used as recording media for storing video/audio information and computer data. One type of digital optical disk widely used as one form of optical recording medium is the compact disc (CD). The diameter of the CD is 12 cm or 8 cm, the thickness of the protective layer protecting the information surface is 1.2 mm, the numerical aperture (hereinafter abbreviated as NA) of the objective lens used for recording or playback is 0.45, and the wavelength of the light source is 780 nm. Another type of digital optical disk called the Digital Versatile Disc (DVD) has a higher recording density than the CD and achieves a large storage capacity. The diameter of the DVD is 12 cm, the thickness of the protective layer protecting the information surface is 0.6 mm, the NA of the objective lens used for recording or playback is 0.6, and the wavelength of the light source is 650 nm.

With advances in information technology, the amount of information handled tends to increase, and there has arisen a need for a digital optical disk that surpasses the CD and the DVD in recording density and storage capacity. An effective method to increase the recording density of a digital optical disk is to increase the NA of the objective lens, shorten the wavelength of the light source, and thereby reduce the diameter of the light spot focused through the objective lens.

However, if the NA of the objective lens is increased, spherical aberration increases as the fourth power of the NA. The spherical aberration also varies when the thickness of the protective layer of the digital optical disk deviates from the specified value. A large spherical aberration would render recording or playback impossible; this limits the tolerances to which the protective layer and the optical system can be fabricated. To address this, it is proposed to reduce the effect of aberration by reducing the thickness of the protective layer to 0.1 mm and thereby suppressing the aberration caused by the tilting of the digital optical disk relative to the objective lens, and to achieve recording or playback on a high recording density digital optical disk by using an objective lens with a large NA and a light source with a short wavelength.

Related art in which such a proposal is implemented is disclosed in Japanese Unexamined Patent Publication JP-A 2000-111402 (2000). In the related art, an optical element is provided between the light source and the objective lens, which optical element is moved in the direction of its optical axis to compensate for the spherical aberration caused due to manufacturing errors in the protective layer thickness of the digital optical disk, and recording or playback is done on the high recording density digital optical disk by using an objective lens with a large NA. In the related art, the optical element is moved to compensate for the spherical aberration that occurs when the protective layer thickness of the digital optical disk contains an error of up to about 10 μm relative to the specified value. With the related art, if a CD or a DVD is to be recorded or played back, the spherical aberration due to the protective layer thickness differing depending on the type of digital optical disk must be compensated for by moving the optical element in the direction of its optical axis.

The difference in protective layer thickness between the CD and the high recording density digital optical disk is 1100 μm, and the difference in protective layer thickness between the DVD and the high recording density digital optical disk is 500 μm. As a result, if the spherical aberration caused due to the difference in protective layer thickness is to be compensated for, the amount of movement of the optical element must be increased. If the distance over which the optical element is moved to compensate for the spherical aberration increases, there arise such problems as the tilting of the optical element, the deviation of the optical axis, and difficulty in maintaining positioning accuracy, and in addition, the time required for positioning becomes longer, impairing user convenience. More specifically, the related art concerns a technique specially designed to record or play back the high recording density digital optical disk with a protective layer thickness as small as 0.1 mm by using an objective lens with a large NA, and therefore has the problem that it cannot be used to record or play back CDs or DVDs that have been distributed and stored in large quantities up to this date.

The related art that solves the above problem is disclosed in Japanese Unexamined Patent Publication JP-A11-120587 (1999). The related art comprises two optical systems, one having an objective lens with a large NA which is used when recording or playing back the high recording density digital optical disk whose protective layer thickness is 0.1 mm, and the other having an objective lens with a small NA which is used when recording or playing back a CD or a DVD. Having two optical systems, the related art has the problem that the number of components increases, increasing the size of the apparatus as well as the manufacturing cost. Furthermore, since the low NA objective lens for the CD and DVD and the high NA objective lens for the high recording density digital optical disk are mounted on the same actuator, the moving part of the actuator increases in weight. The problem of this is that a large driving force becomes necessary to drive the objective lenses, which not only makes high speed driving difficult but poses an obstacle in reducing the power consumption.

SUMMARY OF THE INVENTION

It is an object of the invention to provide an optical pickup apparatus which allows compensation for the spherical aberration caused due to manufacturing errors in thickness of recording media in an optical system including a large NA objective lens, as well as the spherical aberration caused due to recording surface position differences in thickness direction between different types of recording media, and allows recording or playback on different types of recording media.

The invention provides an optical pickup apparatus for a recording medium having a light transmitting layer on which an information signal is recorded, comprising:

a light source for emitting light;

an objective lens for focusing the light emitted from the light source onto the recording medium;

focusing driving means for moving the objective lens in a first direction which is parallel to an optical axis thereof;

tracking driving means for driving the objective lens in a second direction which is perpendicular to the optical axis;

a lens assembly disposed between the light source and the objective lens and having a plurality of lenses each of which is independently displaceable along an optical axis thereof; and driving means for displacing the lenses in the lens assembly independently of each other along the optical axes thereof in such a manner as to reduce a spherical aberration caused due to a thickness of the light transmitting layer and spherical aberrations which occur on optical surfaces of an optical system.

According to the invention, since the moving distance of each lens in the lens assembly can be reduced, positioning accuracy can be enhanced. Furthermore, since the independent lenses can be driven simultaneously, the time required for positioning can be reduced.

According to the invention, with the provision of the lens driving means for displacing the lenses in the lens assembly independently of each other along the optical axes thereof so as to maintain focus on the recording surface of the recording medium, regardless of the type of recording medium, and thereby reduce spherical aberration, the moving distance of each lens in the lens assembly can be reduced by displacing the plurality of lenses in the lens assembly independently of each other, and positioning accuracy can thus be enhanced. Furthermore, since the independent lenses can be driven simultaneously, the time required for positioning can be reduced.

In the invention it is preferable that the optical pickup apparatus comprises:

a first lens as one of the plurality of lenses in the lens assembly, wherein the first lens is disposed in a plane containing an axis line of the recording medium and has an optical axis parallel to the axis line;

optical reflective means disposed on the optical axis at a position nearer to the light source than the first lens is; and a second lens as one of the plurality of lenses in the lens assembly, wherein the second lens is disposed nearer to the light source than the optical reflective means is.

According to the invention, the first lens moves along the first optical axis in a direction parallel to the rotational axis line of the recording medium, while the second lens moves along the second optical axis which intersects the first optical axis at the optical reflective means where the direction of the optical axis is changed. Since this arrangement eliminates the need to provide a large moving area along the direction of the optical axis of the objective lens for the first and second lenses in the lens assembly, the problem of space for accommodating the first and second lenses in the apparatus can be solved, and thus the entire construction of the apparatus can be made thin.

In the invention it is preferable that the optical pickup apparatus comprises:

a first voice coil provided on the objective lens and wound about the optical axis;

a second voice coil provided on the first lens in the lens assembly and wound about the optical axis;

a pair of permanent magnet pieces disposed outward of the first and second voice coils and having magnetic poles oriented perpendicularly to the optical axis;

focusing driving means for performing focusing by varying a current in the first voice coil;

first driving means for performing positioning according to a type of the recording medium by feeding a current to the second voice coil; and second driving means for performing positioning according to the type of the recording medium by driving the second lens along the optical axis thereof.

According to the invention, since the permanent magnet pieces are disposed outward of the first and second voice coils and shared by the focusing driving means and the first driving means, the number of parts such as permanent magnet pieces and yokes can be reduced. This not only serves to reduce the size and weight of the entire apparatus, but also facilitates the assembling thereof and achieves reductions in power consumption and manufacturing cost.

Furthermore, according to the invention, the movement of the lens in the lens assembly is accomplished using two driving means, the first driving means for moving the first lens and the second driving means for driving the second lens. Further, since the permanent magnet pieces are disposed outward of the first and second voice coils and shared by the focusing driving means and the first driving means, the number of parts such as permanent magnet pieces and yokes can be reduced. This not only serves to reduce the size and weight of the entire apparatus, but also facilitates the assembling thereof and achieves reductions in power consumption and manufacturing cost.

In the invention it is preferable that an amount of movement of the first lens driven by the first driving means differs from an amount of movement of the second lens driven by the second driving means.

According to the invention, since the amount of movement differs between the first lens and the second lens, when recording or playing back different types of recording media, the spherical aberration caused due to the difference in protective layer thickness can be compensated for by the lens having the larger amount of movement, while the spherical aberration caused due to manufacturing errors in the protective layer thickness can be compensated for by the lens having the smaller amount of movement. Here, since the lens having the smaller amount of movement can be driven at high speed, the spherical aberration caused due to manufacturing errors in the protective layer thickness of the recording medium itself can be compensated for at high speed to suppress signal degradation.

In the invention it is preferable that an amount of movement of the first lens driven by the first driving means is smaller than an amount of movement of the second lens driven by the second driving means.

According to the invention, since the amount of movement of the first lens is smaller than the amount of movement of the second lens, the first lens having the smaller amount of movement can be accommodated in a limited available space near the objective lens. This serves to reduce the thickness of the entire apparatus and increase user convenience.

In the invention it is preferable that the optical pickup apparatus comprises:

a first supporting structure for supporting the first lens; and a second supporting structure for supporting the second lens, and at least one of the first and second supporting structures includes:

a first supporting member, formed of an elastic material, extending in a direction perpendicular to the optical axis; and a second supporting member, formed of an elastic material, provided parallel to and spaced from the first supporting member in the direction of the optical axis.

According to the invention, since the first or second lens is supported by the first and second supporting members arranged parallel to each other and spaced apart in the direction of the optical axis, the first or second lens can be prevented from tilting relative to the optical axis when the first or second lens is moved along the direction of the optical axis.

In the invention it is preferable that a center of mass of one of the first and second lenses is located about midway between the first and second supporting members along the direction of the optical axis.

According to the invention, since the center of mass of one of the first and second lenses is located about midway between the first and second supporting members along the direction of the optical axis, a stable condition can be maintained if a driving force is exerted when the first or second lens is moved in a direction perpendicular to the optical axis. As a result, when the first or second lens is moved in a direction perpendicular to the optical axis, the occurrence of a resonant mode that causes an angular movement about an axis line perpendicular to the direction of the optical axis can be prevented.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
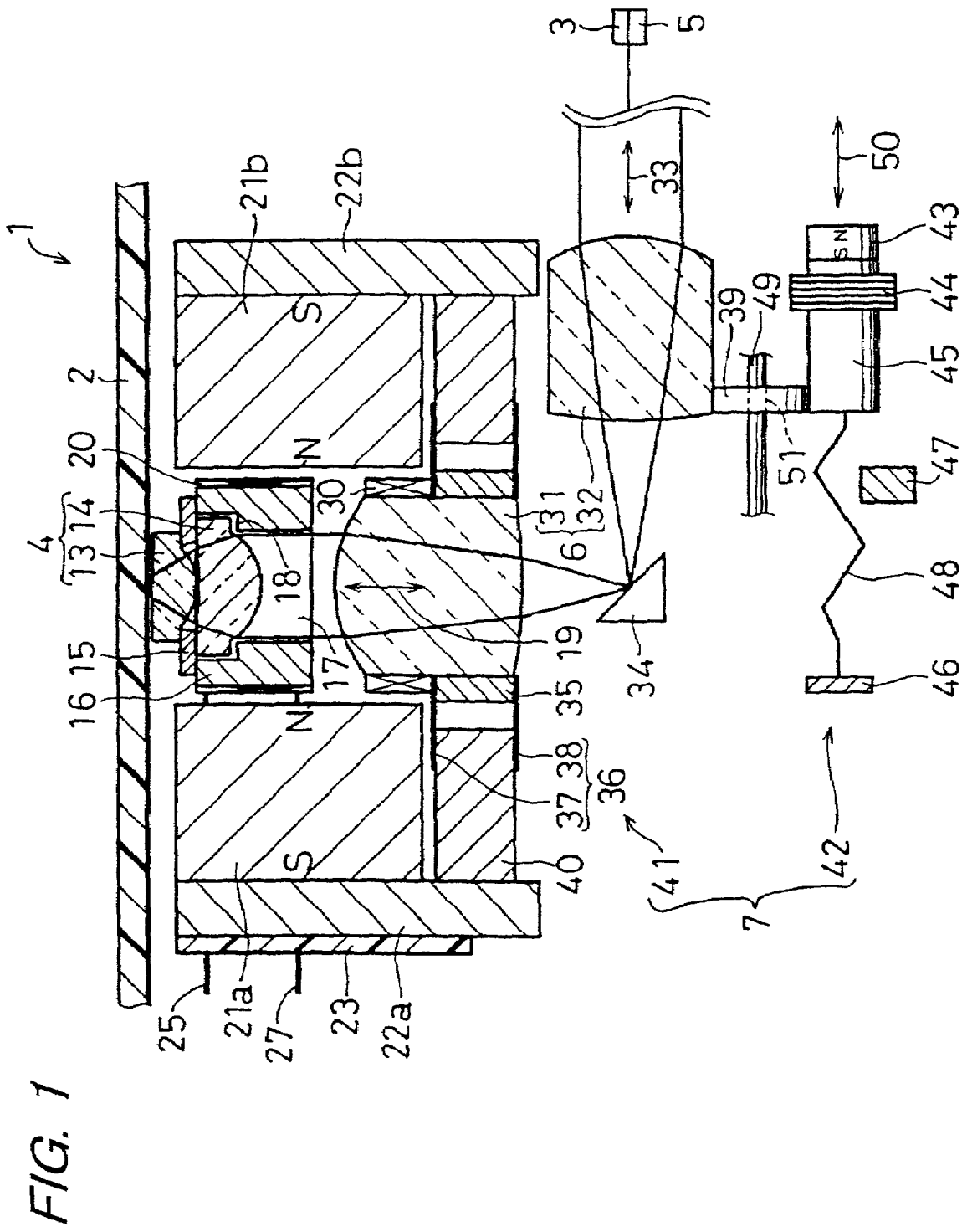
FIG. 1 is a cross sectional view showing in simplified form the construction of an optical pickup apparatus according to one embodiment of the invention.

Now referring to the drawings, preferred embodiments of the invention are described below.

Figure 2:
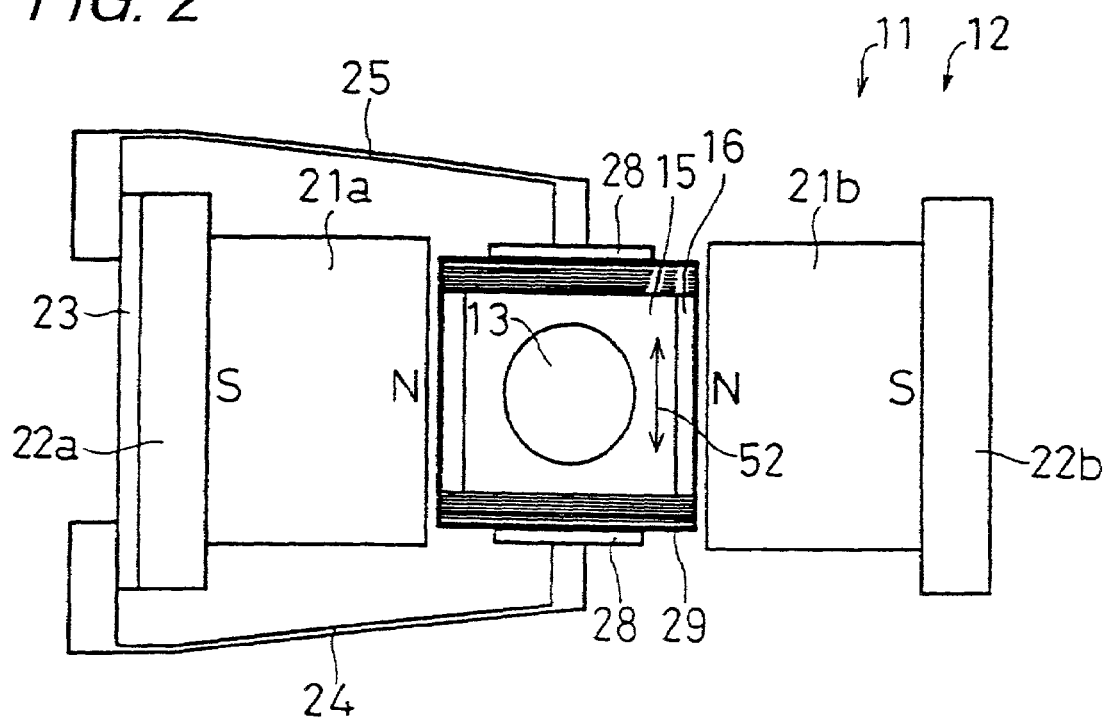
FIG. 2 is a plan view showing in simplified form the construction of a focusing driving means and a tracking driving means contained in the optical pickup apparatus.
Figure 3:
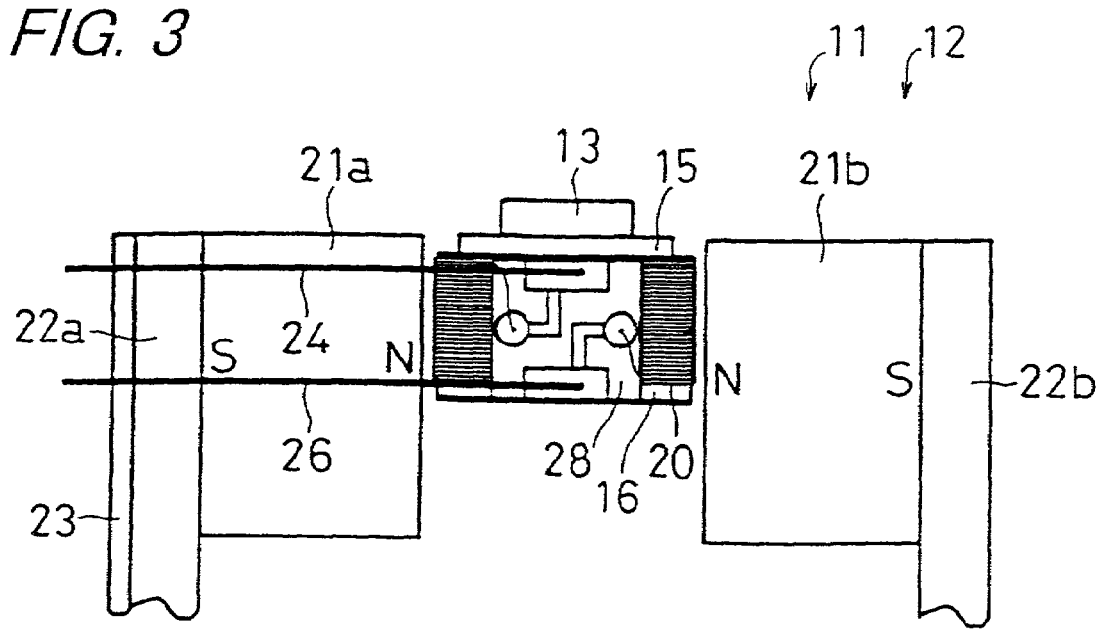
FIG. 3 is a front view of FIG. 2.

FIG. 1 is a cross sectional view showing in simplified form the construction of an optical pickup apparatus 1 according to one embodiment of the invention, FIG. 2 is a plan view showing in simplified form the construction of a focusing driving means 11 and a tracking driving means 12 contained in the optical pickup apparatus 1, and FIG. 3 is a side view of FIG. 2.

The optical pickup apparatus 1 comprises a light source 3, a focusing and tracking objective lens 4, a light detector 5, lens assembly 6 and lens driving means 7. The light source 3 emits light to a recording medium 2 being rotated about a predetermined axis. The objective lens 4 directs and focuses the light from the light source 3 onto a recording surface of the recording medium 2 and directs light reflected from the recording surface to the light detector 5. The light detector 5 is disposed adjacent to the light source 3 and receives the reflected light directed through the objective lens 4. The lens assembly 6 is disposed between the light source 3 and the objective lens 4. The lens assembly 6 has a plurality of lenses each of which is movable independently along its optical axis. The lens driving means 7 moves the respective lenses in the lens assembly 6 independently of each other along their optical axes so as to reduce the spherical aberration caused due to the thickness of the light transmitting layer of the recording medium 2 and the spherical aberration on the optical surfaces of the optical system.

The focusing and tracking objective lens 4 includes a first objective lens 13 disposed facing the recording medium 2 and a second objective lens 14 disposed nearer to the light source 3 than the first objective lens 13 is. A spacer 15 is placed between the first objective lens 13 and the second objective lens 14 and, with this spacer 15, the gap between the first objective lens 13 and the second objective lens 14 is maintained at a predetermined value. A first holding member 16 is provided outward of the objective lens 4. The first holding member 16 is formed with a through-hole 17 through which the light from the light source 3 passes. The spacer 15 is formed with a through-hole 17 through which the light from the light source 3 passes. The second objective lens 14 is inserted in the through-hole 17 and fixed to a step 18 which is formed nearer to the recording medium 2 on the inner circumferential surface of the first holding member 16. The spacer 15 is fixed onto the first holding member 16 and the second objective lens 14 so that the light from the light source 3 can pass through the through-holes. The first objective lens 13 is fixed onto the spacer 15 so that its optical axis is coaxially the optical axis of the second objective lens 14. Thus, the objective lens 4 is held to the first holding member 16.

The first holding member 16 is provided with a first voice coil 20 wound about a first optical axis 19 which lies in the plane containing the axis line of the recording medium 2 and extends parallel to that axis line. Outside the first voice coil 20, a pair of permanent magnet pieces 21a and 21b each magnetized in a direction perpendicular to the first optical axis 19 are disposed opposite each other. The focusing driving means 11 includes a pair of yokes 22a and 22b, a relay board 23, first to fourth spring members 24, 25, 26, and 27, and a printed board 28. Using the first voice coil 20 and the permanent magnet pieces 21a and 21b, the focusing driving means 11 drives the objective lens 4 for focusing in a first direction parallel to the direction of the first optical axis 19.

The pair of yokes 22a and 22b are mounted outward of the permanent magnet pieces 21a and 21b. The relay board 23 is mounted on the outside of the yoke 22a. The first and second spring members 24 and 25 are mounted opposite each other on the side of the first objective lens 13 that is nearer to the light source 3, and extend parallel to the direction that joins the pair of permanent magnet pieces 21a and 21b which are oriented perpendicularly to the first optical axis 19 and disposed opposite each other. The third and fourth spring members 26 and 27 are mounted parallel to and spaced from the first and second spring members 24 and 25 in the direction of the first optical axis 19 toward the light source 3. The first to fourth spring members 24, 25, 26, and 27, each attached at one end to the relay board 23 and at the other end to the printed board 28 fixed to the first holding member 16, elastically support the first holding member 16.

The printed board 28 is electrically connected by soldering to the first voice coil 20 and also to a third voice coil 29 used for tracking described below. The first to fourth spring members 24, 25, 26, and 27 are made of a conductive material such as BeCu. Accordingly, currents can be flown through the first to fourth spring members 24, 25, 26, and 27 to the first voice coil 20 and the third voice coil 29. When a current is flown to the first voice coil 20 mounted between the pair of permanent magnet pieces 21a and 21b, an electromagnetic force acting in the direction of the first optical axis 19 is generated between the first voice coil 20 and the permanent magnet pieces 21a and 21b. Accordingly, the first holding member 16 holding the objective lens 4 therein and elastically supported by the first to fourth spring members 24, 25, 26, and 27 is caused to move in the direction of the first optical axis 19 for focusing.

The first holding member 16 is also provided with the third voice coil 29 which is wound about an axis perpendicular to the direction of the first optical axis 19 as well as to the direction joining the pair of permanent magnet pieces 21a and 21b disposed opposite each other. Using the third voice coil 29 and the permanent magnet pieces 21a and 21b, the tracking driving means 12 drives the objective lens 4 for tracking in a second direction 52 perpendicular to the direction of the first optical axis 19. The structure of the tracking driving means 12 is shared with the focusing driving means 11, and will not be described here. When a current is flown to the third voice coil 29 mounted between the pair of permanent magnet pieces 21a and 21b, an electromagnetic force acting in the direction of arrow 52, which is perpendicular to the first optical axis 19 and parallel to a radial direction of the recording medium 2, is generated between the third voice coil 29 and the permanent magnet pieces 21a and 21b. Accordingly, the first holding member 16 holding the objective lens 4 therein and elastically supported by the first to fourth spring members 24, 25, 26, and 27 is caused to move in the direction of arrow 52 for tracking.

Though not shown here, in the optical pickup apparatus 1 of this embodiment, an optical head, which includes the objective lens 4, the focusing driving means 11, the tracking driving means 12, and a first lens 31 as one of the plurality of lenses in the lens assembly 6 hereinafter described, may be driven by a stepping motor or the like in the radial direction of the recording medium 2 for tracking.

The lens assembly 6 includes the first lens 31 having the first optical axis 19 and a second lens 32 having a second optical axis 33 oriented perpendicularly to the first optical axis 19. In this embodiment, the first and second lenses 31 and 32 are each constructed as a lens system consisting of a plurality of lens elements. An optical reflective means 34 is disposed between the first lens 31 and the second lens 32 in the lens assembly 6 on the first and second optical axes 19 and 33, on the light source 3 side with respect to the first lens 31. The optical reflective means 34 bends the light from the light source 3 as well as the reflected light from the recording medium 2 by 90 degrees, thus making the first optical axis 19 and the second optical axis 33 intersect at right angles to each other. The second lens 32 is disposed nearer to the light source 3 than the optical reflective means 34 is, and directs the light from the light source 3 toward the optical reflective means 34 and the light from the optical reflective means 34 toward the light detector 5. The first lens 31 is provided with a second voice coil 30 wound about the first optical axis 19.

The optical pickup apparatus 1 of the embodiment further includes a first supporting structure 36 for supporting the first lens 31 and a second supporting structure 39 for supporting the second lens 32. The first supporting structure 36 includes a first supporting member 37 formed of an elastic material extending perpendicularly to the first optical axis 19, and a second supporting member 38 formed of an elastic material provided parallel to and spaced from the first supporting member 37 in the direction of the first optical axis 19 toward the light source 3. The first lens 31 is held in a second holding member 35. The inner circumferential edges of the first and second supporting members 37 and 38 are attached to the second holding member 35. The outer circumferential edges of the first and second supporting members 37 and 38 are attached to a first fixing member 40 which extends perpendicularly to the first optical axis 19 and is disposed inward of the yokes 22a and 22b and nearer to the light source 3 than the permanent magnet pieces 21a and 21b are. Accordingly, the first lens 31 is elastically supported by the first supporting structure 36 comprising the first and second supporting members 37 and 38.

In this embodiment, the center of mass of the first lens 31 (more properly the combined structure of the first lens 31, second voice coil 30, and second holding member 35) is located about midway between the first and second supporting members 37 and 38 along the direction of the first optical axis 19.

The first and second supporting members 37 and 38 are made of a conductive material such as BeCu, and a conductive wire that does not interfere with the driving of the first lens 31 is provided on one or the other of the first and second supporting members 37 and 38 so that a current can be fed to the second voice coil 30 through the wire.

The first supporting structure 36 and the second holding member 35 together constitute a first driving means 41 in the lens driving means 7. The first driving means 41 performs the positioning of the first lens 31 in accordance with the type of the recording medium 2 by driving the first lens 31 along the direction of the first optical axis 19 by means of the second voice coil 30 and the permanent magnet pieces 21a and 21b. Herein, the permanent magnet pieces 21a and 21b are shared with the focusing driving means 11 and the tracking driving means 12. When a current is fed to the second voice coil 30 through one or the other of the first and second supporting members 37 and 38, an electromagnetic force acting in the direction of the first optical axis 19 is generated between the second voice coil 30 and the permanent magnet pieces 21a and 21b, thus exerting a driving force to move the first lens 31 along the direction of the first optical axis 19.

Since the first lens 31 is supported by the first and second supporting members 37 and 38 arranged parallel to each other and spaced apart in the direction of the first optical axis 19, the first lens 31 can be prevented from tilting relative to the first optical axis 19 when the first lens 31 is moved along the direction of the first optical axis 19 by the first driving means 41. Furthermore, the center of mass of the first lens 31 is located about midway between the first and second supporting members 37 and 38 along the direction of the first optical axis 19, as earlier described; therefore, when the optical head containing the first lens 31 is driven for tracking, if a driving force perpendicular to the direction of the first optical axis 19 is exerted on the first lens 31, a stable condition can be maintained, preventing the occurrence of a resonant mode that causes an angular movement about an axis line perpendicular to the direction of the first optical axis 19.

A second driving means 42 in the lens driving means 7, which drives the second lens 32 along the second optical axis 33, comprises a first driving magnet piece 43, a first driving coil 44, a first driving yoke 45, a second fixing member 46, a first stopping member 47, and a driving spring member 48. The second driving means 42 is disposed in the plane containing the second optical axis 33, and is arranged along an axis line 50 parallel to the second optical axis 33.

The first driving magnet piece 43 is magnetized in the direction of the axis line 50, and fixed to the body of the optical pickup apparatus 1. The first driving yoke 45 is disposed nearer to the recording medium 2 than the first driving magnet piece 43 is. The first driving yoke 45 is provided with the first driving coil 44 wound about the axis line 50. When a current is fed to the first driving coil 44, a magnetic field is formed in a direction perpendicular to the direction of the current flowing in the first driving coil 44. The first driving yoke 45 is energized by the magnetic field, and the attraction force between the first driving yoke 45 and the first driving magnet piece 43 increases. To the end of the first driving yoke 45 that is nearer to the recording medium 2 is connected one end of the driving spring member 48. To other end of the driving spring member 48 is connected to the second fixing member 46 which is disposed in a predetermined position spaced from the first driving yoke 45. The first stopping member 47 is disposed in a predetermined position intermediate between the second fixing member 46 and the first driving yoke 45. The second fixing member 46 and the first stopping member 47 are fixed to the body of the optical pickup apparatus 1.

The second lens 32 is supported on the second supporting structure 39. The second supporting structure 39 is formed with a through-hole 51. A guide shaft 49 extending along the direction of the second optical axis 33 is passed through the through-hole 51. The guide shaft 49 is fixed to the body of the optical pickup apparatus 1 at a position that does not interfere with the movement of the second lens 32 along the direction of the second optical axis 33. The second supporting structure 39, which supports the second lens 32 thereon, is fixed to the first driving yoke 45 at the side opposite across the guide shaft 49 from the second lens 32. Therefore, when the first driving yoke 45 moves together with the second supporting structure 39, the second lens 32 supported on the second supporting structure 39 also moves along the direction of the second optical axis 33 together with the first driving yoke 45 by being guided along the guide shaft 49.

As previously described, when a current is fed to the first driving coil 44, the attraction force between the first driving yoke 45 and the first driving magnet piece 43 increases. When this attraction force exceeds the compression force of the driving spring member 48, the first driving yoke 45 moves by being guided along the guide shaft 49 until the first driving yoke 45 strikes the first driving magnet piece 43. Since the first driving yoke 45 and the second lens 32 are both fixed to the second supporting structure 39 and move in integral fashion, the second lens 32 moves away in the direction of the second light axis 33 from the side of recording medium 2 and toward the side of light source 3 and is positioned where the first driving yoke 45 strikes the first driving magnet piece 43.

Figure 4:
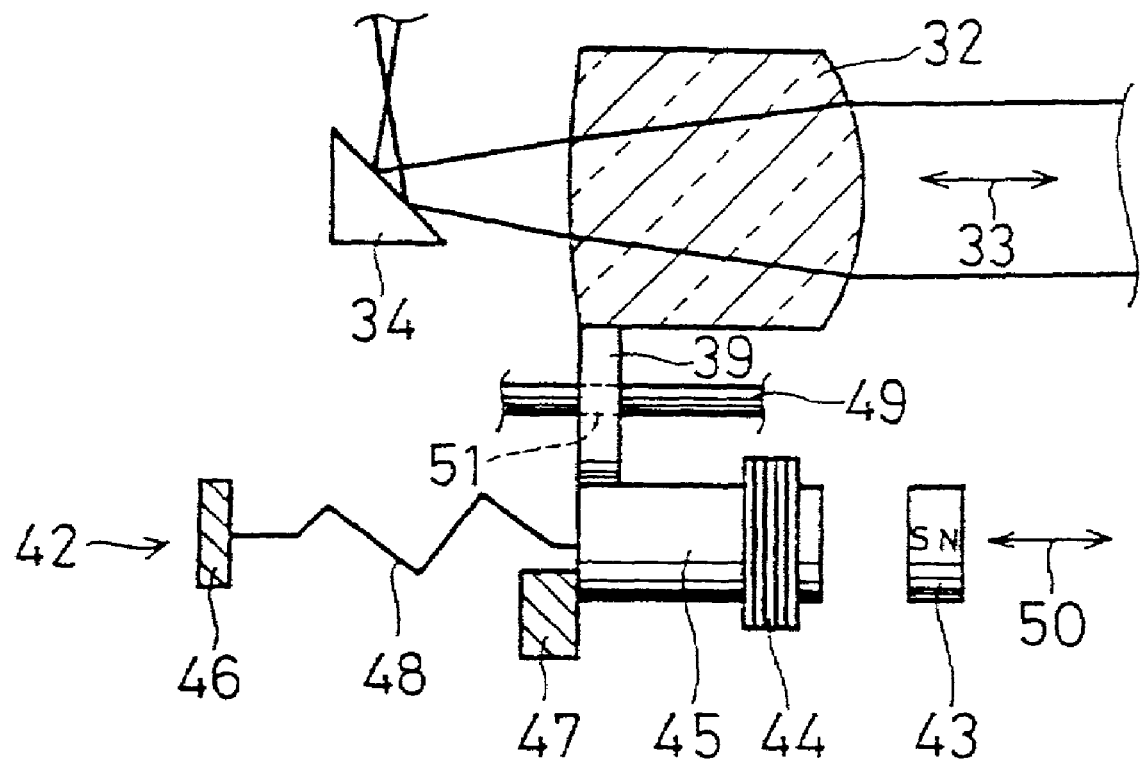
FIG. 4 is a diagram showing the condition in which a second lens is moved by a second driving means in the direction away from the light source and toward the recording medium.

FIG. 4 is a diagram showing the condition in which the second lens 32 is moved by the second driving means 42 in the direction away from the light source 3 and toward the recording medium 2 and is thus set in position. When the first driving coil 44 is de-energized, the first driving yoke 45 is also de-energized because the magnetic field formed by the energized first driving coil 44 is lost. Accordingly, the attraction force between the first driving yoke 45 and the first driving magnet piece 43 becomes smaller than when the first driving coil 44 was energized. As a result, since the compression force of the driving spring member 48 becomes larger than the attraction force between the first driving yoke 45 and the first driving magnet piece 43, the compression force of the driving spring member 48 causes the first driving yoke 45 to move by being guided along the guide shaft 49 until the first driving yoke 45 strikes the first stopping member 47. The second lens 32 moving together with the first driving yoke 45 thus moves away in the direction of the second light axis 33 from the side of light source 3 and toward the side of recording medium 2, and is positioned where the first driving yoke 45 strikes the first stopping member 47.

The positioning control of the second driving means 42 is open loop control, and neither a position detector for detecting the position of the second lens 32 nor a circuit for feeding back the detection output of the position detector is provided. This not only serves to reduce the number of components, but also facilitates the assembling of the apparatus and achieves reductions in power consumption and manufacturing cost.

Figure 5:
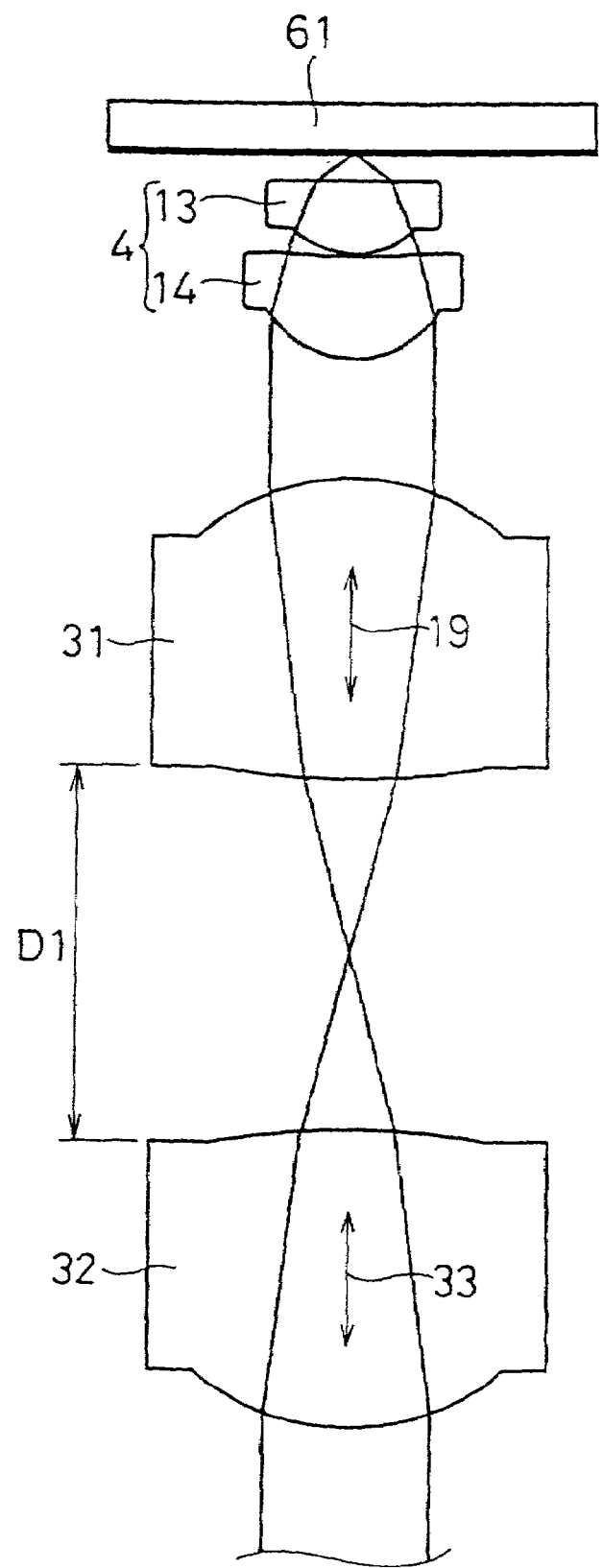
FIG. 5 is a diagram showing in simplified form the arrangement of a first lens and a second lens when recording or playing back a high density recording medium.
Figure 6:
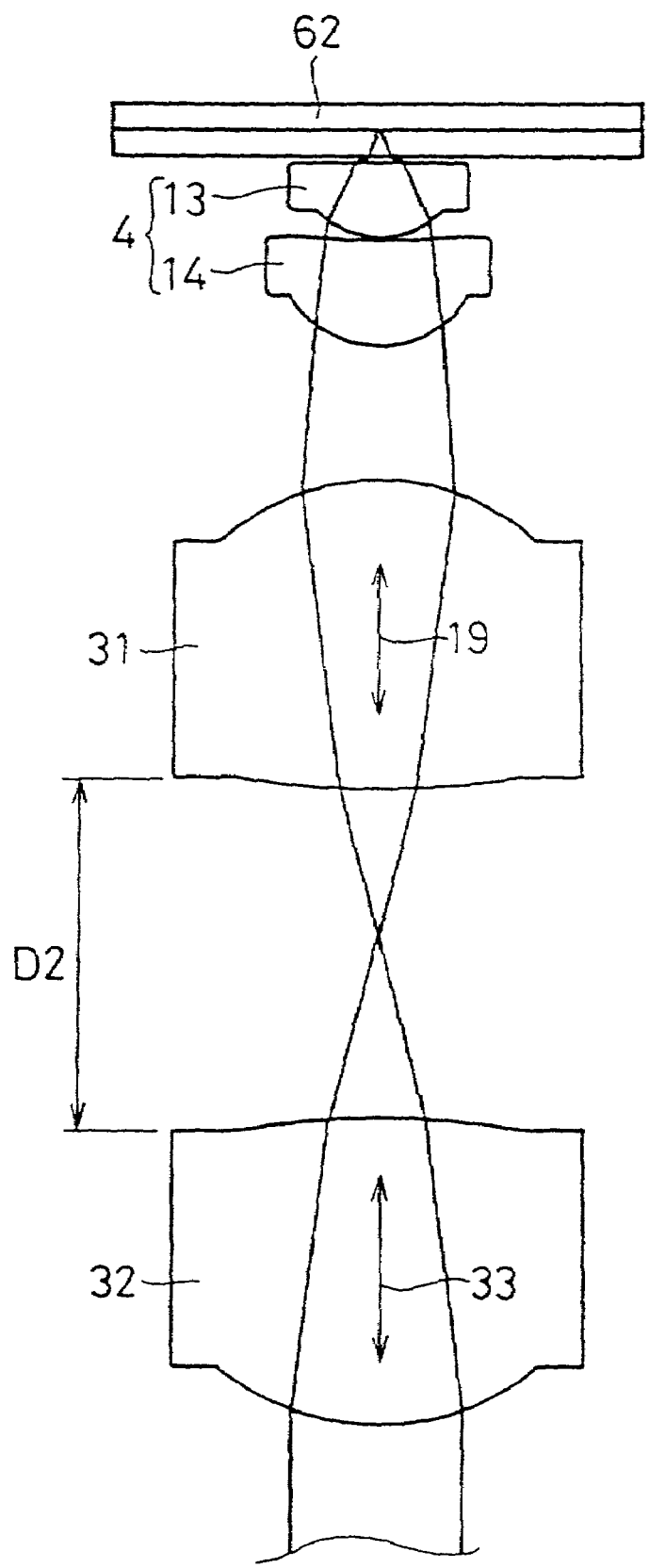
FIG. 6 is a diagram showing in simplified form the arrangement of the first lens and the second lens when recording or playing back a low density recording medium.

FIG. 5 is a diagram showing in simplified form the arrangement of the first lens 31 and the second lens 32 when recording or playing back a high density recording medium 61, and FIG. 6 is a diagram showing in simplified form the arrangement of the first lens 31 and the second lens 32 when recording or playing back a low density recording medium 62. In this embodiment, the first optical axis 19 of the first lens 31 and the second optical axis 33 of the second lens 32 are actually oriented at 90 degrees to each other, since the light is bent by the optical reflective means 34 as earlier described, but in FIGS. 5 and 6, the first and second lenses 31 and 32 are simply shown as being arranged in a straight line to facilitate understanding of their arrangement.

The high density recording medium 61 is, for example, a digital optical disk whose protective layer (hereinafter called the cover glass) protecting the information surface is 0.1 mm in thickness, and the light source 3 with a wavelength of 405 nm and the objective lens 4 with an NA of 0.85 are used for recording or playback of the high density recording medium 61. On the other hand, the low density recording medium 62 is, for example, a DVD whose cover glass is 0.6 mm in thickness, and the light source 3 with a wavelength of 650 nm and the objective lens 4 with an NA of 0.6 are used for recording or playback of the low density recording medium 62. When the type of the recording medium to be recorded or played back, and hence its cover glass thickness, differs, the distance between the first lens 31 and the second lens 32 is varied to compensate for the spherical aberration caused due to the difference in cover glass thickness.

When the recording medium to be recorded or played back is the high density recording medium 61 whose cover glass thickness is thin, the first driving coil 44 is energized to move the second lens 32 and position it where the first driving yoke 45 strikes the first driving magnet piece 43, as previously described. The distance between the second lens 32 and the first lens 31 at this time is denoted by D1.

On the other hand, when the recording medium to be recorded or played back is changed from the high density recording medium 61 whose cover glass thickness is thin to the low density recording medium 62 whose cover glass thickness is thick, the first driving coil 44 is de-energized, allowing the first driving yoke 45 to move to the position where it strikes the first stopping member 47, and the second lens 32 is thus positioned. The distance between the second lens 32 and the first lens 31 at this time is denoted by D2.

The distance D1 between the first lens 31 and the second lens 32 when recording or playing back the high density recording medium 61 is greater than the distance D2 between the first lens 31 and the second lens 32 when recording or playing back the low density recording medium 62. By moving the second lens 32 by the second driving means 42, and by setting the distance between the first lens 31 and the second lens 32 to either D1 or D2 depending on the cover glass thickness of the recording medium, it becomes possible to compensate for the spherical aberration caused due to the cover glass thickness that differs depending on the type of recording medium.

However, since the second driving means 42 uses open-loop control as previously described, the positioning position of the second lens 32 varies each time the second lens 32 is moved, due to manufacturing errors, assembling errors, etc. Therefore, by just moving the second lens 32 by the second driving means 42, it is difficult to minimize the spherical aberration caused due to the difference in the type of recording medium, and it becomes necessary to move the first lens 31 by the first driving means 41 for further adjustment.

The cover glass thickness of the recording medium not only differs depending on the type of recording medium, but also varies due to manufacturing variations among individual recording media of the same type as well as to manufacturing variations within the recording medium itself. The spherical aberration caused due to manufacturing variations in the cover glass thickness among individual recording media of the same type is compensated for by moving the first lens 31 by the first driving means 41.

In the case of the first driving means 41, the value of the current flown to the second voice coil 30 is controlled to control the magnitude of the electromagnetic force generated between the second voice coil 30 and the permanent magnet pieces 21a and 21b and acting in the direction of the first optical axis 19. The first lens 31 is positioned where the magnitude of the electromagnetic force determined by the value of the current flown to the second voice coil 30 is in equilibrium with the force acting to elastically deform the first supporting structure 36 formed of an elastic material for supporting the first lens 31.

The positioning of the first and second lenses 31 and 32 along the respective directions of the first and second optical axes 19 and 33 is performed by driving the first and second lenses 31 and 32 by the first and second driving means 41 and 42 so as to minimize the spherical aberration.

The positions of the first and second lenses 31 and 32 where the spherical aberration is minimized can be obtained, for example, in the following manner. Jitter appearing in the RF signal reproduced from the recording surface of the recording medium 2 is detected and input into a processing circuit, and the processing circuit produces such an output as to minimize the jitter and thereby controls the driving of the first and second driving means 41 and 42 to position the first and second lenses 31 and 32 where the spherical aberration can be minimize.

The first lens 31 moves along the first optical axis 19, while the second lens 32 moves along the second optical axis 33 oriented perpendicularly to the first optical axis 19. Since this arrangement eliminates the need to provide a large moving area along the direction of the optical axis of the objective lens for the first and second lenses in the lens assembly, the problem of space for accommodating the first and second lenses in the optical pickup apparatus 1 can be solved, and thus the entire construction of the optical pickup apparatus 1 can be made thin. The movement of the lens assembly 6 necessary to compensate for spherical aberration is accomplished using the first driving means 41, which drives the first lens 31, and the second driving means 42, which drives the second lens 32. With this arrangement, the amount of movement that each of the first and second lenses 31 and 32 has to accomplish can be made smaller than would be the case if the lenses in the lens assembly 6 had to be driven by one driving means. This serves to enhance the positioning accuracy. Furthermore, by driving the first and second driving means 41 and 42 simultaneously, the time required to position the first and second lenses 31 and 32 can be reduced.

FIGS. 5 and 6 have been described by dealing with the high density recording medium and the DVD as an example of the low density recording medium, but the low density recording medium is not limited to the DVD, but the CD or a recording medium having two or more recording layers stacked in the direction of the optical axis may be taken as an example.

Figure 7:
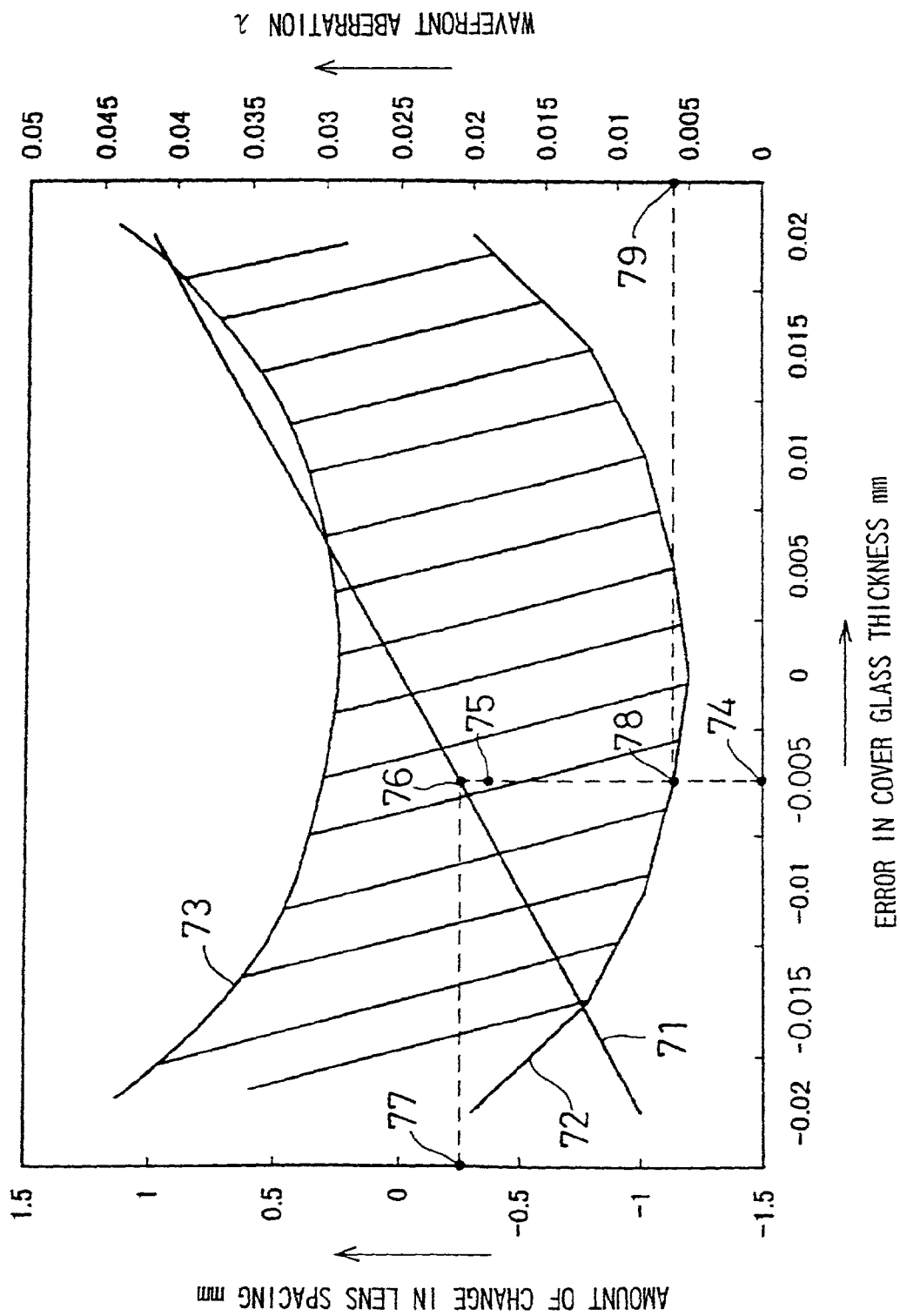
FIG. 7 is a diagram showing the relationships of wavefront aberration and amount of change in lens spacing relative to errors in cover glass thickness.

FIG. 7 is a diagram showing the relationships of wavefront aberration and amount of change in lens spacing relative to errors in cover glass thickness. The movement of the first and second lenses 31 and 32 and compensation for wavefront aberration will be described with reference to FIG. 7. FIG. 7 shows an example of how wavefront aberration is compensated for by moving the first and second lenses 31 and 32 when the cover glass thickness of the recording medium is 0.1 mm, the wavelength of the light source used for recording or playback is 405 nm, and the NA of the objective lens is 0.85. The wavefront aberration shown in FIG. 7 consists mostly of spherical aberration and is therefore substantially equal to spherical aberration.

In FIG. 7, the wavefront aberration $\lambda$ plotted along the vertical axis means that the wavefront aberration is represented by the ratio to the wavelength $\lambda$ of the light source. Further, in FIG. 7, the amount of change in lens spacing plotted along the vertical axis means the amount by which the spacing between the first lens 31 and the second lens 32 is increased or decreased from D1 or D2 when the first lens 31 is driven by the first driving means 41 after the second lens 32 is driven by the second driving means 42 and positioned to set the spacing between the first lens 31 and the second lens 32 to D1 or D2.

A first straight line 71 in FIG. 7 represents the relationship between errors in cover glass thickness and the amount of change in lens spacing between the first and second lenses 31 and 32. A first curve 72 in FIG. 7 defines the minimum value to which the wavefront aberration caused due to errors in cover glass thickness can be reduced by moving the first lens 31 in accordance with the relationship to the amount of change in lens spacing. The hatched area bounded by the first curve 72 and a second curve 73 indicates the range of variations in wavefront aberration that occur when the second lens 32 is moved by the second driving means 42.

To compensate for the wavefront aberration caused due to the cover glass thickness that differs depending on the type of recording medium, first the second lens 32 is moved by the second driving means 42 and set in the predetermined position on the second optical axis 33. Since the second driving means 42 uses open loop control, as earlier described, each time the second lens 32 is moved the positioning position of the second lens 32, and hence the wavefront aberration, varies due to manufacturing errors, assembly errors, aging, etc. Assume here that the error in the cover glass thickness of the recording medium is at point 74 in FIG. 7. When the second lens 32 is moved by the second driving means 42, since the positioning position of the second lens 32 varies, the wavefront aberration is now at a certain point within the hatched area in FIG. 7, for example, at point 75.

The amount of distance over which the first lens 31 is to be moved to compensate for the wavefront aberration at point 75 is indicated by the amount of change in lens spacing at point 77 on the vertical axis corresponding to the point 76 on the straight line 71. When the first lens 31 is moved by the first driving means 41 by an amount equal to the amount of change in lens spacing indicated at point 77, the wavefront aberration is compensated for and is reduced to the minimum value indicated at point 78 on the first curve 72. The wavefront aberration at this time is given by point 79 on the vertical axis corresponding to the point 78.

Figure 8:
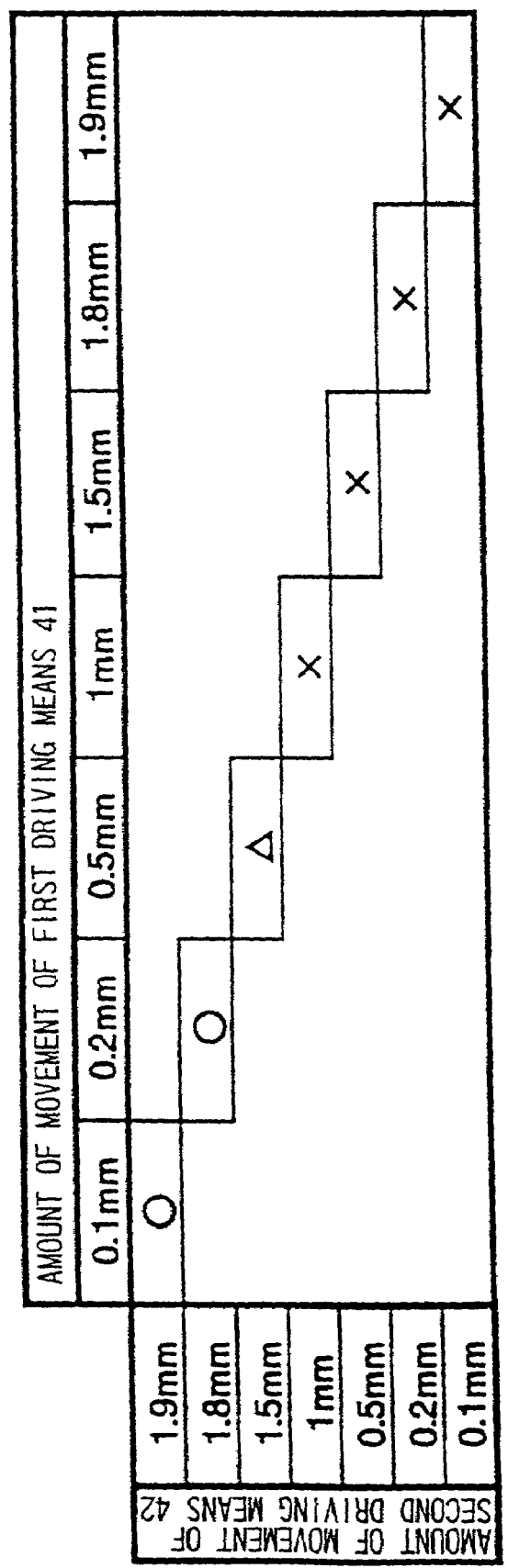
FIG. 8 is a diagram showing various combinations of the amount of movement of the first lens and that of the second lens that are suited or not suited to compensate for spherical aberration when the cover glass thickness of the recording medium differs by 40 μm.

FIG. 8 is a diagram showing various combinations of the amount of movement of the first lens 31 and that of the second lens 32 that are suited or not suited to compensate for the spherical aberration when the cover glass thickness of the recording medium differs by 40 μm. The recording medium to be recorded or played back was changed to a recording medium whose cover glass thickness differed by 40 μm, and various combinations of the amount of movement of the first lens 31 and that of the second lens 32 were experimented to see whether they were suited to compensate for the spherical aberration. The results are shown in FIG. 8. In the example of FIG. 8, the wavelength of the light source used for recording or playback was 405 nm, and the NA of the objective lens was 0.85.

From the standpoint of reducing the size of the apparatus and reducing the time required to position the first and second lenses 31 and 32, the combinations marked with ○ in FIG. 8 are desirable in this embodiment. The reason is that the first lens 31 can be accommodated in a limited available space near the objective lens 4 because the amount of movement of the first lens 31 is smaller than the amount of movement of the second lens 32.

This serves to reduce the thickness of the entire optical pickup apparatus 1 and increase user convenience. Furthermore, by reducing the moving distance, the required driving force can be reduced, and hence, the driving speed can be increased. As a result, the spherical aberration caused due to manufacturing errors in the cover glass thickness of the recording medium itself can be compensated for at high speed to suppress signal degradation. If the amount of movement of the second driving means 42 is increased, and open loop driving is used, not only can the apparatus size be reduced and the driving speed increased, but the amount of peripheral circuitry, etc. can be reduced since no sensors are needed.

Figure 9:
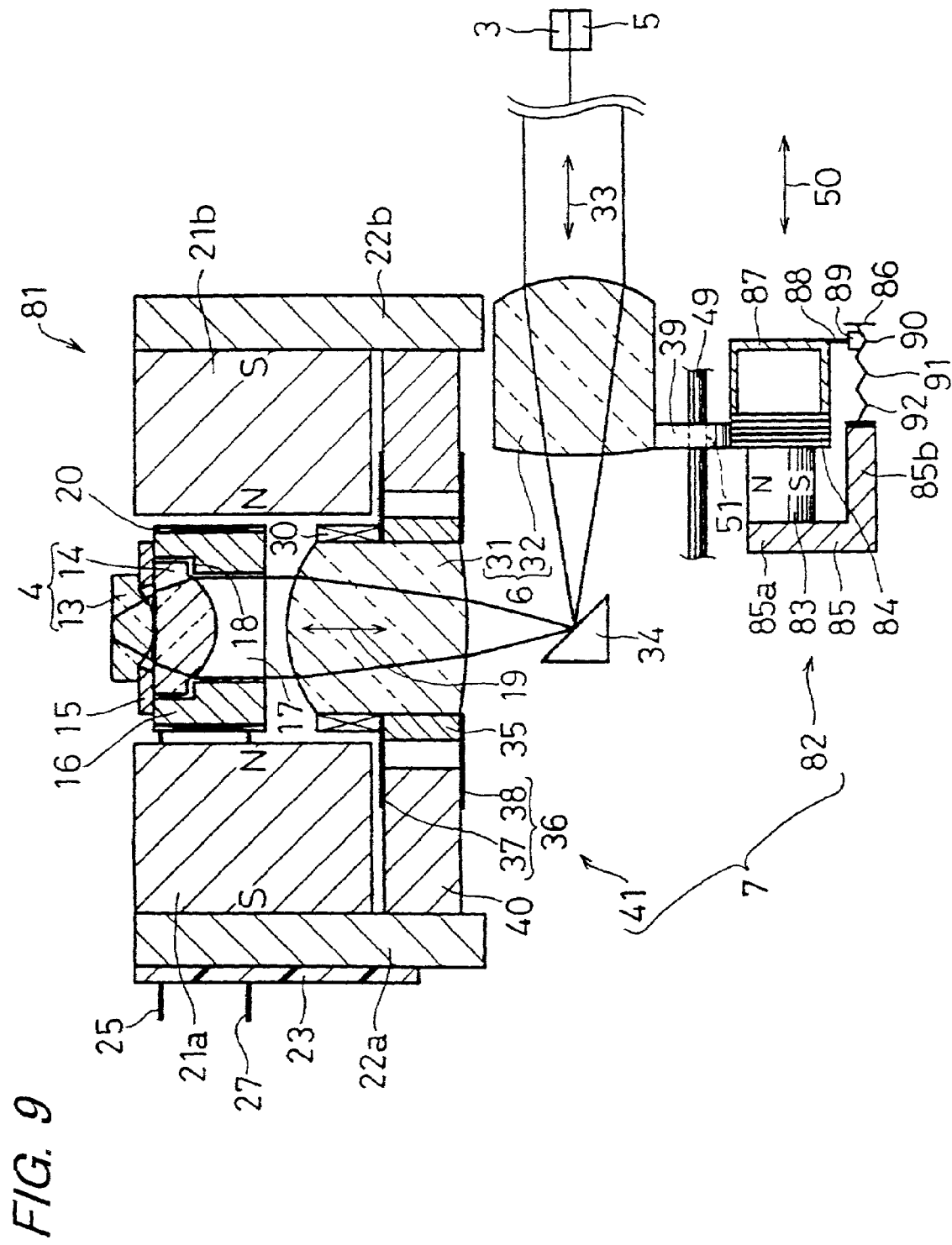
FIG. 9 is a cross sectional view showing in simplified form the construction of an optical pickup apparatus according to a second embodiment of the invention.

FIG. 9 is a cross sectional view showing in simplified form the construction of an optical pickup apparatus 81 according to a second embodiment of the invention. The optical pickup apparatus 81 of this embodiment is similar to the optical pickup apparatus 1 of the first embodiment, and corresponding parts will be designated by the same reference numerals and will not be described in detail here. The optical pickup apparatus 81 includes a second driving means 82. What should be noted in this embodiment is that the second driving means 82 includes three engaging portions for positioning the second lens 32.

The second driving means 82 in the lens driving means 7, which drives the second lens 32 along the second optical axis 33, includes a second driving magnet piece 83, a second driving coil 84, a second driving yoke 85, a second stopping member 86, and a movable piece 87. The movable piece 87 is provided with a plate spring member 88 attached to its end nearer to the light source 3. A protruding member 89 is attached to a free end of the plate spring member 88. The second supporting structure 39 is fixed to the movable piece 87. The movable piece 87 can move together with the second lens 32 and the second supporting structure 39. The second driving means 82 is disposed in the plane containing the second optical axis 33, and is arranged along the axis line 50 parallel to the second optical axis 33.

The second driving yoke 85 is a member formed of a magnetic material such as iron and having an L-shaped cross section, and is fixed to the body of the optical pickup apparatus 81. A vertical member 85a extends vertically to the axis line 50 of the second driving yoke 85. The second driving magnet piece 83 is fixed near the end of the vertical member 85a. A horizontal member 85b extends horizontally along the axis line 50 of the second driving yoke 85. The second stopping member 86 is attached to the end nearer to the light source 3 of the horizontal member 85b. The second stopping member 86 is formed with first to third engaging portions 90, 91, and 92 for positioning the second lens 32 by engaging with the protruding member 89. The first to third engaging portions 90, 91, and 92 are arranged in this order from the light source 3 side toward the recording medium 2 side along axis line 50 to the direction of the second optical axis 33.

The second driving magnet piece 83 is magnetized in a direction perpendicular to the axis line 50, and is fixed to the vertical member 85a of the second driving yoke 85 as earlier described. The movable piece 87 is provided with the second driving coil 84 which is wound about the axis line 50. When a current is fed to the second driving coil 84, a magnetic field perpendicular to the axis line 50 is formed in the plane containing the second driving coil 84 and inwardly of the second driving coil 84, and with this magnetic field, a driving force acting parallel to the direction of the axis line 50 is generated within the second driving coil 84. This driving force drives the movable piece 87, and hence the second supporting structure 39 and the second lens 32, along the direction of the axis line 50.

Figure 10:
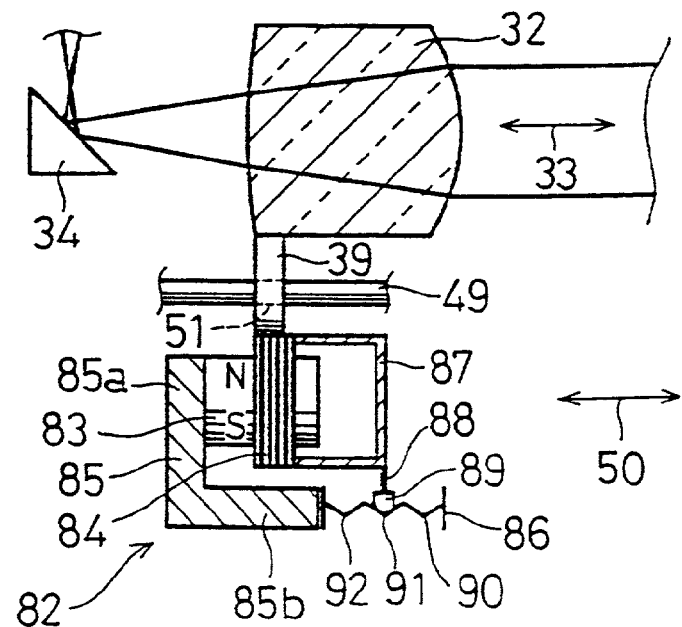
FIG. 10 is a diagram showing the condition in which the second lens is moved by a second driving means from the light source side toward the recording medium side and is positioned with a protruding member engaged with a second engaging portion.
Figure 11:
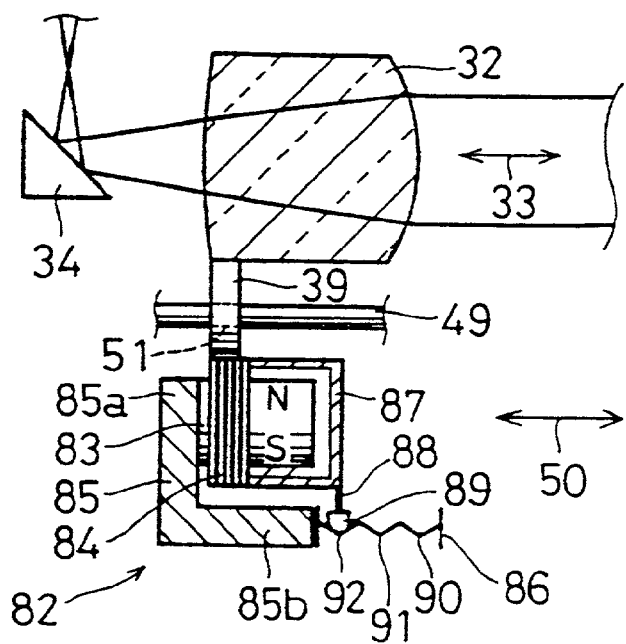
FIG. 11 is a diagram showing the condition in which the second lens is moved by the second driving means from the light source side toward the recording medium side and is positioned with the protruding member engaged with a third engaging portion.

FIG. 10 is a diagram showing the condition in which the second lens 32 is moved by the second driving means 82 from the light source 3 side toward the recording medium 2 side and is positioned with the protruding member 89 engaged with the second engaging portion 91. FIG. 11 is a diagram showing the condition in which the second lens 32 is moved by the second driving means 82 from the light source 3 side toward the recording medium 2 side and is positioned with the protruding member 89 engaged with the third engaging portion 92.

When a current is fed to the second driving coil 84, a driving force parallel to the axis line 50 and directed toward the recording medium 2 side is generated in the second driving coil 84, causing the second lens 32 to move from the light source 3 side toward the recording medium 2 side. At this time, the plate spring member 88 attached to the movable piece 87 is elastically deformed as the movable piece 87 moves, allowing the protruding member 89 to move from the first engaging portion 90 to the second engaging portion 91. When the protruding member 89 is engaged with the second engaging portion 91, if the second driving coil 84 is de-energized, the movable piece 87 is set in position with the protruding member 89 engaged with the second engaging portion 91. Hence, the second lens 32 moving together with the movable piece 87 is also set in position with the protruding member 89 engaged with the second engaging portion 91.

If energization of the second driving coil 84 is continued, the movable piece 87 continues to move from the light source 3 side toward the recording medium 2 side, causing the protruding member 89 to move to the third engaging portion 92, as earlier described; as a result, the second lens 32 is set in position with the protruding member 89 engaged with the third engaging portion 92.

When the direction of the current flown to the second driving coil 84 is reversed from the above direction, a driving force parallel to the axis line 50 and directed toward the light source 3 side is generated in the second driving coil 84; as a result, the movable piece 87 with the second driving coil 84 wound there around, and hence the second lens 32, moves from the recording medium 2 side toward the light source 3 side, i.e., in the direction opposite to the above direction; in this way, the second lens 32 can be set in the desired position corresponding to one of the first to third engaging portions 90 to 92. The second lens 32 can thus be set precisely in the position that matches the cover glass thickness of the recording medium irrespective of the type of the recording medium.

As described above, in the first and second embodiments of the invention, the driving means 7 for moving the respective lenses in the lens assembly 6 independently of each other has been shown as comprising two driving means, i.e., the first driving means 41 and the second driving means 42, but it will be recognized that the driving means 7 may be constructed from more than two driving means. Further, though the first lens 31 and the second lens 32 have been shown as being arranged with the first optical axis 19 and the second optical axis 33 oriented perpendicularly to each other, the configuration need not be limited to this particular arrangement; for example, the first lens 31 and the second lens 32 may be arranged with the first optical axis 19 and the second optical axis 33 oriented at any suitable angle to each other, or may be arranged in a straight line. The first and second lenses 31 and 32 have also been described as being constructed from a plurality of lenses, but alternatively, the first and second lenses may each be constructed from a single lens. Furthermore, the number of positions where the second lens 32 can be positions by the second driving means 42 has been described as being two or three, but the number need not be limited to two or three; rather, the structure may be configured so that the second lens 32 can be positioned at four or more positions.

The invention may be embodied in other specific forms without departing from the spirit or essential characteristics there of. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An optical pickup apparatus for a recording medium having a light transmitting layer on which an information signal is recorded, comprising:
   a light source for emitting light;
   an objective lens for focusing the light emitted from the light source onto the recording medium;
   focusing driving means for moving the objective lens in a first direction which is parallel to an optical axis thereof;
   tracking driving means for driving the objective lens in a second direction which is perpendicular to the optical axis;
   a lens assembly disposed between the light source and the objective lens and having first and second lenses each of which is independently displaceable along an optical axis thereof;
   driving means, having separate driving elements corresponding to the respective lenses in the lens assembly, for displacing the corresponding lenses in the lens assembly independently of each other along the optical axis thereof in such a manner as to reduce a spherical aberration caused due to a thickness of the light transmitting layer and spherical aberrations which occur on optical surfaces of an optical system;
   a first voice coil provided on the objective lens and wound about the optical axis;
   a second voice coil provided on the first lens in the lens assembly and wound about the optical axis;
   a pair of permanent magnet pieces disposed outward of the first and second voice coils and magnetic poles oriented perpendicularly to the optical axis;
   said focusing driving means performing focusing by varying the current in said first voice coil;
   first driving means for performing positioning according to a type of the recording medium by feeding a current to the second voice coil; and
   second driving means for performing positioning according to a type of the recording medium by driving the second lens along the optical axis thereof.

2. The optical pickup apparatus of claim 1, further comprising:
   optical reflective means disposed on the optical axis at a position nearer to the light source than the first lens;
   wherein the first lens has an optical axis disposed in a plane containing an axis line of the recording medium, said optical axis being parallel to said axis line; and
   wherein the second lens is disposed nearer to the light source than the optical reflective means.

3. The optical pickup apparatus of claim 1, wherein an amount of movement of the first lens driven by the first driving means differs from an amount of movement of the second lens driven by the second driving means.

4. The optical pickup apparatus of claim 3, wherein an amount of movement of the first lens driven by the first driving means is smaller than an amount of movement of the second lens driven by the second driving means.

5. The optical pickup apparatus of claim 1, further comprising:
   a first supporting structure for supporting the first lens; and
   a second supporting structure for supporting the second lens, and
   at least one of the first and second supporting structures includes:

a first supporting member, formed of an elastic material, extending in a direction perpendicular to the optical axis; and a second supporting member, formed of an elastic material, provided parallel to and spaced from the first supporting member in the direction of the optical axis.

6. The optical pickup apparatus of claim 5, wherein a center of mass of one of the first and second lenses is located about midway between the first and second supporting members along the direction of the optical axis.

* * * * *

UNITED STATES PATENT AND TRADEMARK OFFICE
CERTIFICATE OF CORRECTION

PATENT NO.         : 7,035,173 B2  
APPLICATION NO. : 10/004641  
DATED              : April 25, 2006  
INVENTOR(S)       : Masayuki Nishikawa It is certified that error appears in the above-identified patent and that said Letters Patent is hereby corrected as shown below:

On the cover page Column 1 Item (56) in the section designated "U.S. PATENT DOCUMENTS" please add:

--5,148,421, Sept. 15, 1992, Isao Satoh, et al., 369/44.230--

--5,157,555, October 20, 1992, Charles. W. Reno, 359/823--

--RE37,185E, May 22, 2001, Isao Satoh, et al., 369/44.23--

On the cover page of the patent at Colunm 2 continuation of Item (56) in the section designated "FOREIGN PATENT DOCUMENTS" please add:

--JP 8-180446, July 12, 1996--

--JP 2000-11402, 1/14/2000--

Signed and Sealed this

Fifth Day of September, 2006

JON W. DUDAS  
*Director of the United States Patent and Trademark Office*